United States Patent [19]

Levinrad

[11] Patent Number: 5,197,811
[45] Date of Patent: Mar. 30, 1993

[54] KEYBOARD

[76] Inventor: Maxim D. Levinrad, P.O. Box 808, 42107 Natania, Israel

[21] Appl. No.: 887,944

[22] Filed: May 26, 1992

[30] Foreign Application Priority Data

May 31, 1991 [IL] Israel .................................. 98329

[51] Int. Cl.⁵ .................................................. B41J 5/08
[52] U.S. Cl. ................................ 400/489; 400/100; 400/485
[58] Field of Search ................. 400/489, 485, 486, 82, 400/87, 100, 109, 110, 111

[56] References Cited

U.S. PATENT DOCUMENTS

| | | | |
|---|---|---|---|
| 4,211,497 | 7/1980 | Montgomery | 400/486 |
| 4,655,621 | 4/1987 | Holden | 400/100 |
| 4,846,598 | 7/1989 | Livits | 400/485 |
| 4,911,565 | 3/1990 | Ryan | 400/100 |
| 5,006,001 | 4/1991 | Vulcano | 400/489 |
| 5,059,048 | 10/1991 | Sirkin | 400/489 |
| 5,122,786 | 6/1992 | Rader | 400/489 |

FOREIGN PATENT DOCUMENTS 0122880 10/1984 European Pat. Off. ............ 400/100

OTHER PUBLICATIONS

IBM Tech. Disclosure Bulletin, "Easy-to-Learn Programmable Keyboard" vol. 24 No. 5 Oct. 1981 p. 2465.

Primary Examiner—Edgar S. Burr
Assistant Examiner—Lynn D. Hendrickson
Attorney, Agent, or Firm—Benjamin J. Barish

[57] ABSTRACT

A keyboard operable by one hand includes a first group of four elongated finger keys extending vertically in parallel spaced relation so as to be accessible by the four fingers of a user's hand, and a second group of thumb keys extending laterally of the first group and spaced vertically with respect to each other so as to be accessible by the user's thumb. The keyboard may include a first section operable by one hand and having the above two groups of keys for selecting alphabetical characters, and a second section operable by the second hand having further keys for selecting numerical characters, punctuation and operational controls.

10 Claims, 2 Drawing Sheets

KEYBOARD

BACKGROUND OF THE INVENTION

The present invention relates to keyboards, such as are used in electric typewriters, wordprocessors, computers, electronic notebooks, etc.

The standard (QWERTY) keyboard, designed for using two hands, has not changed significantly in over one hundred years. Although many proposals have been made to change the standard keyboard, apparently the advantages of such past proposals were not sufficient to justify any drastic change. In addition, many portable keyboards are too crowded for efficient use.

OBJECTS AND SUMMARY OF THE INVENTION

An object of the present invention is to provide a novel keyboard having number of advantages as will be a described more particularly below.

According to the present invention, there is provided a keyboard operable by one hand, comprising: a first group including four elongated finger keys extending generally vertically in parallel spaced relation so as to be accessible by the four fingers of a user's hand; and a second group of keys extending in horizontal alignment with and laterally of the first group and spaced vertically with respect to each other so as to be accessible by the user's thumb, such as to permit a selected finger key and the thumb key aligned therewith to be simultaneously depressed by the user's hand to select a character of the keyboard.

In the preferred embodiment of the invention described below, each group of keys is marked with all the characters of the alphabet such that each alphabetical character is selected by simultaneously depressing a finger key and a thumb key. Thus, the circuitry would require a finger key and a corresponding thumb key to be depressed in order for a character to be selected.

More particularly, in the described embodiment, each finger key is marked with a plurality of characters extending vertically of the key, with each character marking being aligned with the thumb key for the respective character. The keys of the first group (the "finger keys") are marked with the alphabetical characters in a substantially alphabetical sequence, with some modification, such as the grouping of all vowels under the leftmost vertical key, with each key including one character in the respective sequence. Each key of the second group (the "thumb keys") is allocated to the letters of the four keys of the first group with which the key of the second group is aligned.

According to further features in the preferred embodiment of the invention described below, the keyboard may include a first section (the alphabetical section) operated by one hand (e.g. the right hand), having the two groups of keys a described above for selecting alphabetical characters, and a second section operated by the second hand (e.g. the left hand) having further dedicated keys for selecting numerical characters, punctuation, operational controls, etc. The second section may be separable from the first section, so that each section could be placed comfortably under one hand of the operator. Alternatively, the second section could be pivotally mounted to the first section, to enable it to be folded over the first section for compact storage when not in use.

A keyboard constructed in accordance with the foregoing features provides a number of advantages over the standard keyboard. Thus, the alphabetical section, requiring only eleven keys in the described preferred embodiment, can be operated swiftly and efficiently with one hand, leaving the other hand available for selecting the numerical characters, punctuation, operational controls, etc., which are generally selected less frequently than the alphabetical characters. Also, since the alphabetical section can accommodate all the alphabetical characters, there is no need for a Shift key, thereby increasing the speed capability of the keyboard as well as reducing errors when the Shift key is not properly operated. Further, the number of keys can be significantly reduced, thereby enabling a more compact, less crowded keyboard, and also enabling the greater use of dedicated keys. The alphabetical section of the keyboard can also be learned very quickly, even by a non-experienced person. In addition, this construction is likely to cause fewer errors, since the inadvertent depression of one key in the alphabetical section will be ineffective. The foregoing advantages make the novel keyboard particularly useful for lap-type units.

Furthermore, a keyboard according to the present invention could be used in addition to, as well as a replacement for, a conventional keyboard to give users unfamiliar with typing on a conventional keyboard easier access to computers and typewriters. In addition, since all the alphabetical characters are on one section of the keyboard, this section may be easily replaced in order to adapt the keyboard to other languages, without changing the second section. For left- handers, the alphabetical keyboard section could easily be constructed with the corresponding keys on the other side, so that the keyboard may be turned over for use by a left-handed typist.

Further features and advantages of the invention will be apparent from the description below.

BRIEF DESCRIPTION OF THE DRAWINGS

The invention is hereby described, by way of example only, with reference to the accompanying drawings, wherein.

DESCRIPTION OF A PREFERRED EMBODIMENT

Figure 1:
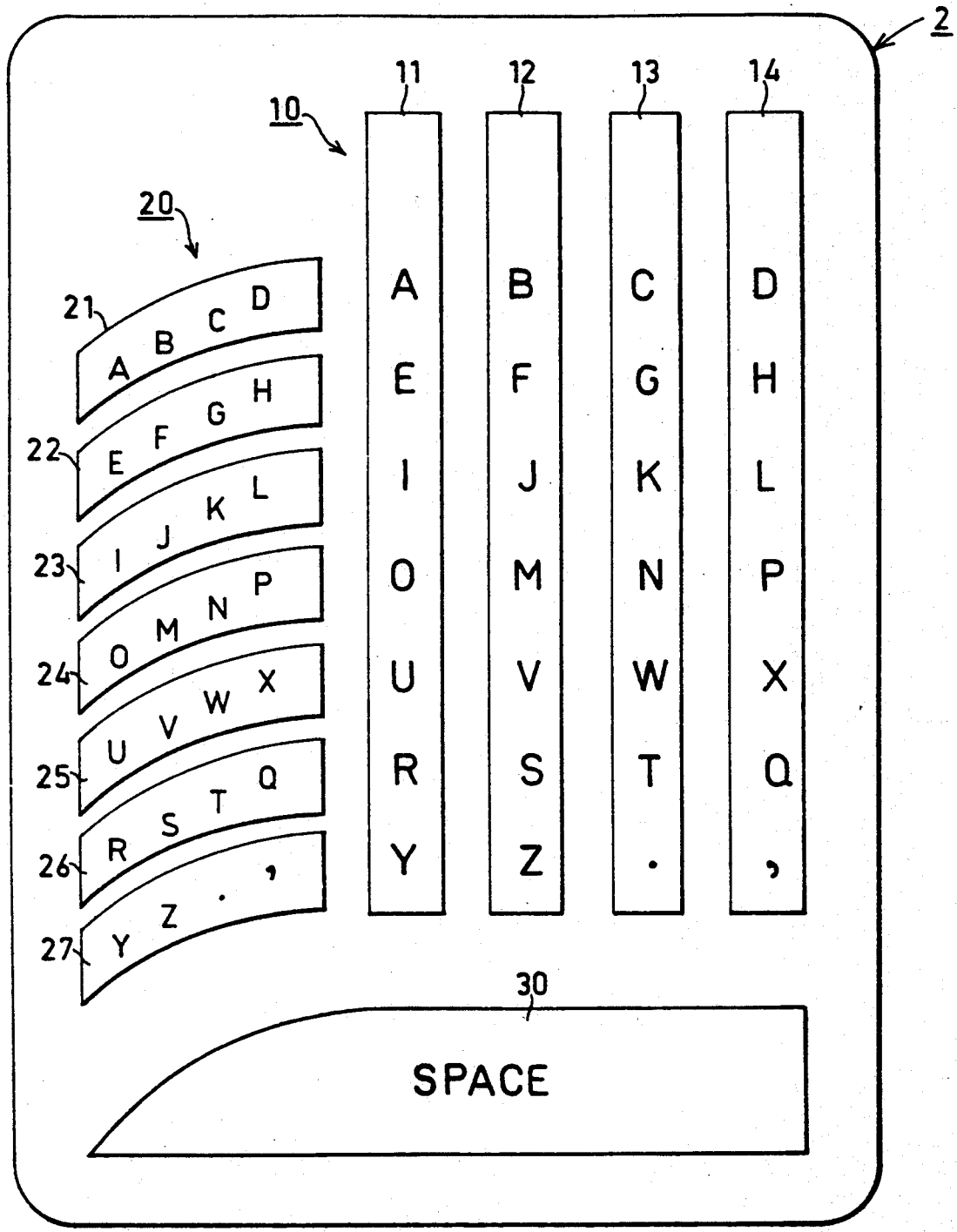
FIG. 1 illustrates one form of alphabetical section of a keyboard constructed in accordance with the present invention and operable by one hand.
Figure 2:
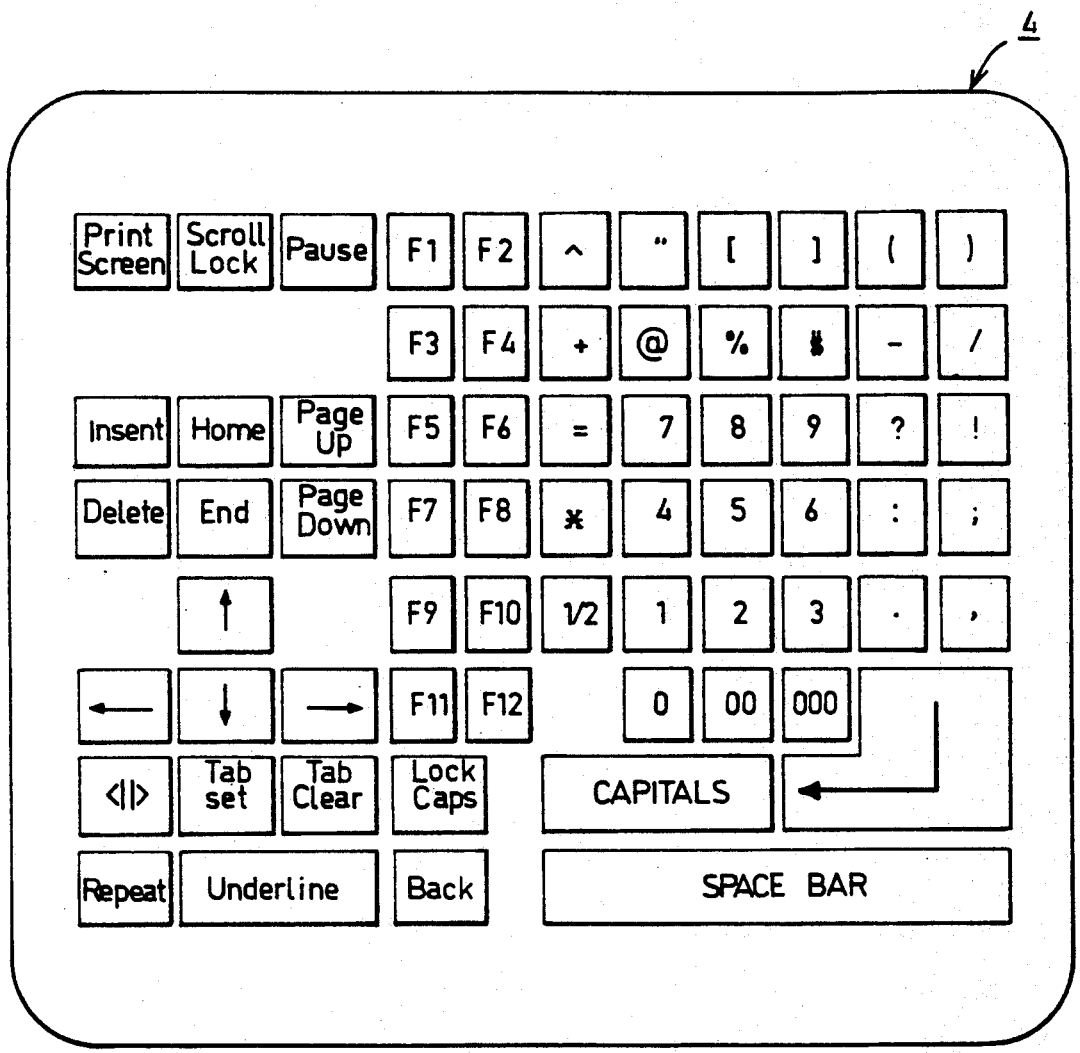
FIG. 2 illustrates one form of a second section of a keyboard constructed in accordance with the present invention and operable by a second hand.

As indicated above, a complete keyboard constructed i accordance with the present invention would normally include two sections, namely, an alphabetical section, generally designated 2 in FIG. 1, operated by one hand, and a second section, generally designated 4 in FIG. 2, operated by a second hand. For example, the alphabetical section 2 illustrated in FIG. 1 would be operated by the right hand to select primarily the alphabetical characters, whereas the second section 4 illustrated in FIG. 2 would be operated by the left hand for selecting numerical characters, other punctuation, operation controls, capitals, an additional space bar, and the like.

The keyboard section 2 illustrated in FIG. 1 of the drawings comprises two groups of keys, each group being generally designated 10 and 20, respectively.

Group 10 consists of four elongated finger keys 11–14 extending vertically in parallel spaced relation so as to be accessible by the four fingers of the user's hand; and group 20 includes seven thumb keys extending generally horizontally, laterally of the finger keys 11–14 and spaced vertically with respect to each other so as to be accessible by the user's thumb. This gives a total of 28 possible characters. Since the English language uses only 26 letters, this leaves two extra characters which could be used for a period and comma, for example. It will be clear that different languages will have different requirements in terms of numbers of characters and will require modification of the number of keys used.

The finger keys 11–14 are marked with alphabetical characters in a substantially alphabetical sequence, with each including one character in the respective sequence. thus, key 11 includes character "A", key 12 includes character "B", key 13 includes character "C", key 14 includes character "D", and so on through the complete alphabet. However, in the arrangement illustrated in the drawing, the sequence of the characters is substantially according to the standard alphabetical order, but not exactly. Thus, the "A", "E", "I", "O" and "U", which are frequently used, are located so as to be operated by the first finger key 11. Preferably, the finger keys 11–14 are given a concave configuration to guide the vertical movement of the user's fingers. Preferably, keys 11–14 and 21–27, or some of them, feature certain protrusions to help the user locate his/her fingers properly. This feature is especially helpful for users who are blind.

The thumb keys 21–27 correspond to the finger keys; that is, each thumb key is allocated to the letters on the four finger keys with which letters it is aligned. The drawing shows these keys as being marked with their corresponding characters, but this is not essential.

The thumb keys 21–27 are of preferably arcuate configuration and curve upwardly towards the finger keys 11–14 to conform to the hand configuration. It will be appreciated that the user's finger does not have to be moved to any particular position of the depressed keys, so long as the required two keys are simultaneously depressed. For example, to select the character "O", keys 11 and 24 must be simultaneously depressed.

It has been found that the above-described sequential arranging of the keys enables the keyboard to be quickly learned, and also to be conveniently operated at high speed.

The illustrated keyboard further includes a Space bar 30 extending below the finger keys 11–14 and the thumb keys 21–27 so as to be accessible to the heel of the user's hand adjacent the wrist, or to the user's thumb, if desired.

The left-hand section 4 of the keyboard, as illustrated in FIG. 2, includes keys for selecting the numerical characters, keys for selecting punctuation, and keys for selecting various operational controls, as in a conventional keyboard. Section 4 of the keyboard further includes a Shift key for selecting capital letters, etc., as well as an additional Space bar. Preferably, all the keys are dedicated keys and are arranged in a logical sequence.

It will be seen that the keyboard section 2 illustrated in FIG. 1 can be conveniently operated by a single hand. Thus, in order to select any character, two keys must be depressed, namely one of the finger keys 11–14, and one of the thumb keys 21–27. The operator can thus quickly slide the hand up and down to align the thumb with one of the keys 21–27, to select any desired character.

Such a keyboard can be easily operated by anyone seeing it or the first time, and is particularly useful for non-experienced people having to make computer or typewriter entries. With practice, an operator is able to type as fast as or faster than with the standard keyboard, especially when using touch keys. The illustrated keyboard can be learned very quickly with a few minutes of practice. It can also be constructed very compactly, thereby making it ideally suited for lap-computers; it is also less susceptible to errors. The keyboard could be double-sided for use by a left-handed person.

The two sections of the keyboard can be made separable, so that each section may be placed comfortably under one hand of the operator, thereby not only alleviating the unnatural hunched-shoulder position of the operator, but also enabling the text to be placed centrally under the operator's eyes. The two sections could be pivotally mounted to each other, to enable them to be folded to provide a compact assembly when not in use.

It is also contemplated that the alphabetical section 2 of the keyboard could be used alone, i.e. without the other section 4. For this purpose, the alphabetical section 2 could include a Shift key and if necessary an additional key or keys, e.g. for selecting punctuation, etc.

While the invention has been described with respect to one embodiment, it will be appreciated that this is set forth purely for purposes of example, and that many other variations, modifications and applications of the invention may be made.

What is claimed is:

1. A keyboard operable by one hand, comprising: a first group including four elongated finger keys extending generally vertically in parallel spaced relation so as to be accessible by the four fingers of a user's hand; and a second group of keys extending in horizontal alignment with and laterally of the first group and spaced vertically with respect to each other so as to be accessible by the user's thumb such as to permit a selected finger key and he thumb key aligned therewith to be simultaneously depressed by he user's hand to select a character of the keyboard.

2. The keyboard according to claim 1, wherein each group of keys is marked with all the characters of the alphabet such that each alphabetical character is selected by simultaneously depressing a finger key and a thumb key.

3. The keyboard according to claim 2, wherein each finger key is marked with a plurality of characters extending vertically of the key, with each character marking being aligned with the thumb key for he respective character.

4. The keyboard according to claim 1, further including a Space bar extending below said first and second groups of keys so as to be accessible to the thumb or heel of the user's hand adjacent the wrist.

5. The keyboard according to claim 1, wherein the keys of said second group are of arcuate configuration and curve upwardly towards said first group of keys.

6. The keyboard according to claim 1, wherein there are seven keys in said second group of keys.

7. The keyboard according to claim 1, wherein the keys of the first group are marked with the alphabetical characters in a substantially alphabetical sequence, with each key including one character in the respective sequence.

8. A keyboard including a first section operable by one hand and having the two groups of keys according to claim 1 for selecting alphabetical characters, and a second section operable by a second hand having further keys for selecting numerical characters, punctuation and operational controls.

9. The keyboard according to claim 8, wherein said second section is separable from said first section.

10. The keyboard according to claim 8, wherein said section is pivotally mounted to said first section.

* * * * *